Aug. 24, 1943.  C. HOLLERITH  2,327,427
DUAL BRAKE ARRANGEMENT FOR TRAINER AIRPLANES
Filed April 24, 1940

Inventor
CHARLES HOLLERITH

By Beaman & Langford
Attorneys

Patented Aug. 24, 1943

2,327,427

UNITED STATES PATENT OFFICE 2,327,427

DUAL BRAKE ARRANGEMENT FOR TRAINER AIRPLANES

Charles Hollerith, Jackson, Mich., assignor to Hayes Industries, Inc., Jackson, Mich., a corporation of Michigan Application April 24, 1940, Serial No. 331,321

1 Claim. (Cl. 244—84)

The present invention relates to a safety device for training airplanes and more particularly to a dual brake arrangement to limit the braking of the wheels by a student pilot.

Training airplanes are commonly equipped with dual controls, one set for an instructor and the other set for a student pilot. In the training of student pilots, it sometimes occurs that the student becomes panicky, and under such stress exerts so much force on the controls that it is not possible for the pilot to maintain the airplane under complete control. One situation that sometimes occurs when the student becomes panicky is the excessive application of the wheel brakes by the student upon landing, resulting in the plane nosing over. According to the present invention, this possibility is eliminated by arranging the controls which convey the force from the foot of the student to the braking mechanism in such a manner that it is not possible for the student to apply full braking effort to the wheels. The arrangement is such that the force transmitted by the student to the braking mechanism is less than that transmitted by the instructor to the braking mechanism due to a structure providing a less mechanical advantage in transmitting the braking force from the student than is provided in transmitting the braking force from the instructor. With such an arrangement the instructor may exert full braking effort on the wheels, while the student may exert only a partial braking effort on the wheels. An object of the invention is to provide dual brake controls with means for limiting the transmission of force by one of the controls.

Another object of the invention is to provide dual brake controls for transmitting force with a mechanical advantage, that for one of the controls being less than that for the other.

The present invention constitutes an improvement to the construction disclosed in Patent No. 1,874,493, to Charles G. Geignetter.

These and other objects will be apparent from the following specification when taken with the accompanying drawing in which.

Figure 2:
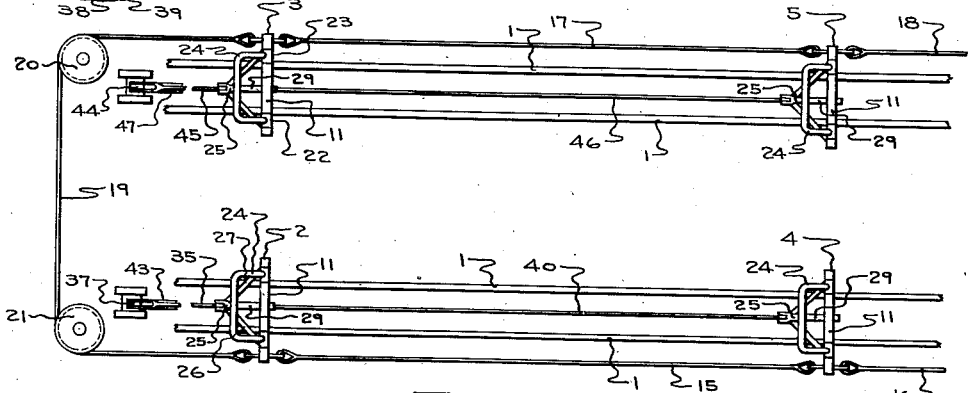
Fig. 2 is a plan view of the construction disclosed in Fig. 1.
Figure 3:
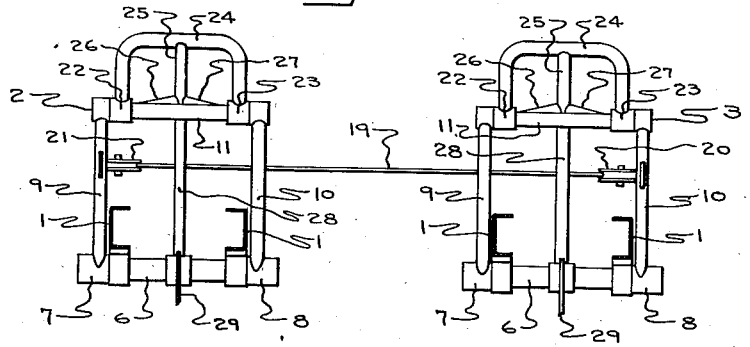
Fig. 3 is a rear view of a pair of the rudder and brake pedal assemblies.

Referring particularly to the drawing, the reference characters 1 indicate portions of the frame of an airplane. Connected to the frame members 1 are a pair of forward rudder and brake pedal assemblies 2 and 3, and a pair of rear rudder and brake pedal assemblies 4 and 5. These assemblies are similar to those disclosed in aforesaid Patent No. 1,874,493. Each of the assemblies 2, 3, 4 and 5 is supported from a shaft 6 rigidly connected to two of the frame members 1, as shown particularly in Fig. 3. Rotatably mounted on the ends of each shaft 6 are sleeve members 7 and 8 to which are connected respectively, normally upright tubes 9 and 10. Connected to and bridging the upper ends of the tubes 9 and 10 is a tube 11. One end of a cable 15 is connected to the tube 9, of the assembly 2, and the other end is connected to the tube 9 of the assembly 4. Also connected to the tube 9 of the assembly 4 is one end of a cable 16, the other end of which is connected to one side of the rudder, not shown. As shown particularly in Fig. 2, one end of a cable 17 is connected to the tube 10 of the assembly 3, and the other end is connected to the tube 10 of the assembly 5, and also connected to the tube 10 of the assembly 5 is one end of a cable 18, the other end of which is connected to the other side of the rudder, not shown. A cable 19 is disposed about pulleys 20 and 21 in front of the assemblies 2 and 3 and is connected at one end to the tube 9 of the assembly 2 and at the other end to the tube 10 of the assembly 3, as shown in Fig. 2. The structure thus far described is that for operating the rudder of the airplane in which the structure is mounted.

The brake operating mechanism consists of parallelogram frameworks, one being mounted on each of the rudder operating structures. Mounted for oscillation on each of the tubes 11 are sleeves 22 and 23 to which are secured the opposite ends of an inverted U-shaped tube 24. Secured to the approximate center of each tube 24 and extending downwardly and forwardly therefrom is a tube 25. Adjacent the lower end of each tube 25 is a pair of forwardly converging tubes 26 and 27 which are connected to each tube 25 at the points of convergence respectively. The opposite ends of the tubes 26 and 27 are connected to the sleeves 22 and 23 respectively. It will be seen that the tubes 24, 25, 26 and 27 provided strongly braced frames rotatable about the tubes 11 through the sleeves 22 and 23.

Connected to each of the aforesaid frameworks at the juncture of the tubes 25, 26 and 27 is a normally downwardly extending tube 28 connected also to a bell crank lever 29 having a forwardly extending arm 30 and a downwardly extending arm 31. Each bell crank lever 29 is mounted for oscillation about a shaft 6.

Connected to the downwardly extending arm 31 of the bell crank lever 29 of the assembly 2 is one end of a cable 35. The other end of the cable 35 is connected at the point 36 to a lever 37, pivoted at 38 to another part 39 of the frame of the airplane. Connected to the downwardly extending arm 31 of the bell crank lever 29 of the assembly 4 is one end of a cable 40, the other end of which is connected at the point 41 to the lever 37. Pivoted to the lever 37 at the point 42 is a member 43 comprising a part of some suitable brake mechanism for braking the left wheel of the airplane. Similar to the lever 37 is another lever 44, having attached thereto cables 45 and 46, similar to the cables 35 and 40 respectively for actuation by the assemblies 3 and 5 respectively for controlling the braking of the right wheel of the airplane. A member 47 comprising a part of brake mechanism for braking the right wheel is connected to the lever 44 in the same relation to the cables 45 and 46 as the relation of the member 43 to the cables 35 and 40.

Figure 1:
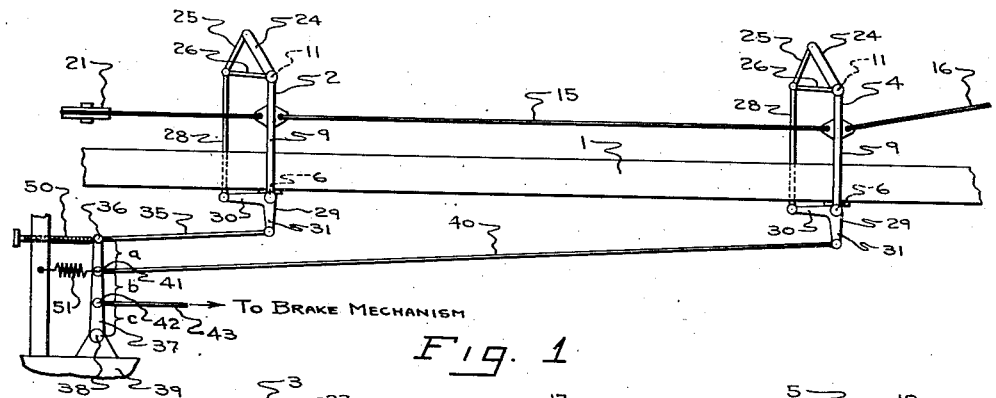
Fig. 1 is a side elevation disclosing the present invention.

In connecting the cables 35 and 40 to the lever 37 and the cables 45 and 46 to the lever 44, the distance $a$ between the points 36 and 41, as shown in Fig. 1, the distance $b$ between the points 41 and 42, and the distance $c$ between the points 42 and 38 should be equal. In this way, the force transmitted by the assemblies 2 and 3 to the brake mechanisms for the left and right wheels respectively will be three halves that transmitted by the assemblies 4 and 5 to the left and right wheels respectively. In training planes, the instructor usually sits in the front seat and the student sits in the rear seat. Arrangement of the apparatus for this seating is shown in the drawing. With the apparatus according to the present invention for transmitting force from the feet of the instructor and student to the brake mechanism, it is possible for the student to apply only two-thirds of the braking force applied by the instructor due to the respective mechanical advantages employed. The mechanical advantages should be so proportioned that the instructor may apply full braking force, while the student may only apply a portion of the braking force. While in the form of the invention shown, the student may apply only two-thirds of the full braking force, it is to be understood that the ratio between the braking forces applicable from the front and rear control positions may be proportioned as desired, by changing the position of points 41 at which cables 40 and 46 are connected to the levers 37 and 44 respectively. In order that each of the levers 37 and 44 may be returned to starting position, following actuation, they are each provided with an adjustable stop 50 against which they are yieldably drawn by springs 51 respectively.

The braking mechanism actuated by the levers 37 and 44 may be for either mechanical or hydraulic brakes as desired. In the case of hydraulic brakes, it will be readily understood by those skilled in the art, that there would be an operative connection between the levers 37 and 44 with a master hydraulic cylinder, not shown.

In the operation of the structure, according to the present invention, the tube 11 of each assembly 2, 3, 4 and 5, constitutes a foot tread for actuating the rudder. When it is desired to apply the left brake, the toe portion of the foot is urged against the U-tube 24 of the assembly 2 or 4, and when it is desired to apply the right brake, the toe portion of the foot is pressed against the U-tube 24 of the assembly 3 or 5. When it is desired to apply both brakes at the same time, the feet are simultaneously pressed against the U-tubes 24 of the assemblies 2 and 3, or 4 and 5.

It will be apparent from the foregoing specification that the structure illustrating the invention, which has been described, is merely a single example of various structures that could be devised to carry out the broad principles of the invention. Accordingly, I do not wish to be limited except by the scope of the following claim.

I claim:

In a dual brake system for training airplanes, brake mechanism, brake pedal means for operation by an instructor, brake pedal means for operation by a student pilot, a lever pivoted to a relatively fixed point, an operative connection between said lever and said brake mechanism, a member connecting said instructor's brake pedal means to said lever, a second member connecting said student pilot's brake pedal means to said lever, one of said members being connected to said lever at one point and the other of said members being connected to said lever at another point, said points being spaced different distances from said pivotal point of said lever, whereby force is transmitted by a different mechanical advantage from each brake pedal means to said brake mechanism.

CHARLES HOLLERITH.